T. SHIPLEY.
CONDENSER FOR ICE MAKING AND REFRIGERATING MACHINES.
APPLICATION FILED MAY 31, 1917.

1,234,438.

Patented July 24, 1917.
9 SHEETS—SHEET 3.

Fig. 3

Inventor
Thomas Shipley,
By Marshall Dairy
Attorney

UNITED STATES PATENT OFFICE.

THOMAS SHIPLEY, OF YORK, PENNSYLVANIA.

CONDENSER FOR ICE-MAKING AND REFRIGERATING MACHINES.

1,234,438.

Specification of Letters Patent. Patented July 24, 1917.

Application filed May 31, 1917. Serial No. 171,924.

*To all whom it may concern:*

Be it known that I, THOMAS SHIPLEY, a resident of the city of York, in the county of York and State of Pennsylvania, have invented certain new and useful Improvements in Condensers for Ice-Making and Refrigerating Machines, of which the following is a specification.

This application, so far as concerns the subject matter of claims 1–5 inclusive of the same, is a continuation of my application for improvements in ice making and refrigerating machines Serial No. 140,988 filed January 6, 1917.

My invention relates to condensers, and more particularly ammonia condensers for use in refrigerating and ice-making plants.

Ammonia condensers, in industrial use, usually consists of a battery of coils or sections which are supplied with the gas to be condensed from a common header provided with individual outlets leading from it to the inlets of the respective sections of the battery. In the practical operation of such a battery of condensing sections, it has been found to be impossible to secure an equal admission of gas from the header to the several condensing sections, owing not only to the varying condition of the gas entering the header which always carries more or less entrained liquid with it, but also to the tendency of the entrained liquid in the gas, after entering the gas header, to separate and be carried past the outlets leading from said header to some of the condensing sections and also to pass along with gas in varying quantities through other of said outlets to the inlets of their respective condensing sections, thereby choking up said inlets to some extent and in varying degrees, thus preventing an equal distribution of gas from the header to the several condensing sections and also causing some of them to receive the entrained liquid in greater quantity than others, all of which results in an irregular and intermittent operation of the several sections, and a loss of efficiency in the condenser as a whole.

This condition of affairs is considerably aggravated in any type of condenser containing pre-coolers for utilizing, for the extraction of the super-heat of the gas before admitting it to the condenser-proper, the condensing water after it has been used for condensing purposes. In this pre-cooling process, owing to the varying conditions of the gas, cooling water, etc., it is practically impossible to extract only the superheat, and varying quantities of liquid result in the several pre-coolers in that type of condenser having a pre-cooler for each condenser section, or in the single pre-cooler in that type of condenser having only one pre-cooler common to all the condenser sections, which varying quantities of liquid, in either case, also pass with the gas to the several condenser-sections-proper, and thus enhance the tendency to intermittent and inefficient operation.

Moreover, in that type of condenser now commonly known as the flooded condenser, in which the gas is injected under pressure into a body of liquid contained in the circuit, as described and claimed in my Patent No. 1,079,610 of November 25, 1913, these difficulties are still further aggravated by the fact that for the successful operation of the injector (where one is used) by which the gas is discharged under pressure into the body of liquid, it is necessary for it to have a somewhat contracted discharge orifice whose liability to be choked up by the slugs of liquid accompanying the gas increases with its contraction.

It is the object of my invention to overcome these difficulties, to which end I combine with the body of the condenser, the inlet or nozzle through which the gas to be condensed is introduced therein, and the source of supply from which the thus-introduced gas is drawn, means interposed between said inlet or nozzle and said source of gas supply whereby the entrained liquid contained in the thus-supplied gas is separated out and carried off from said gas before the latter enters the condenser. It is in this combination of instrumentalities that my invention is mainly comprised.

In the case of all types of condensers equipped with a pre-cooler for each condenser section, the separating means should preferably be interposed between the several pre-coolers and their respective condenser sections. And in the case of all types of condensers having but one pre-cooler common to a plurality of condenser sections, said separating means should preferably be interposed between such pre-cooler and a gas header located between the pre-cooler and the condenser sections, and receiving its supply of gas from the pre-cooler and distributing it through separate conduits to the individual condenser sections. And in the flooded type of condenser, the bodies of liquid, one for each condenser section, into and through which the gas thus-freed from entrained liquid is forced, should all of them be maintained at the same level and have the same head—means for doing which constitute another feature of my invention. When this has been accomplished, all that remains to be done to secure uniform action in all of the sections of the condenser is to see to it that the condensing water is properly distributed over or through each section.

To enable those skilled in the art to understand and use my invention, I will now proceed to describe more particularly the manner in which the same is or may be carried into practical effect by reference to the accompanying drawings forming part of this specification, in which—

Figure 1:
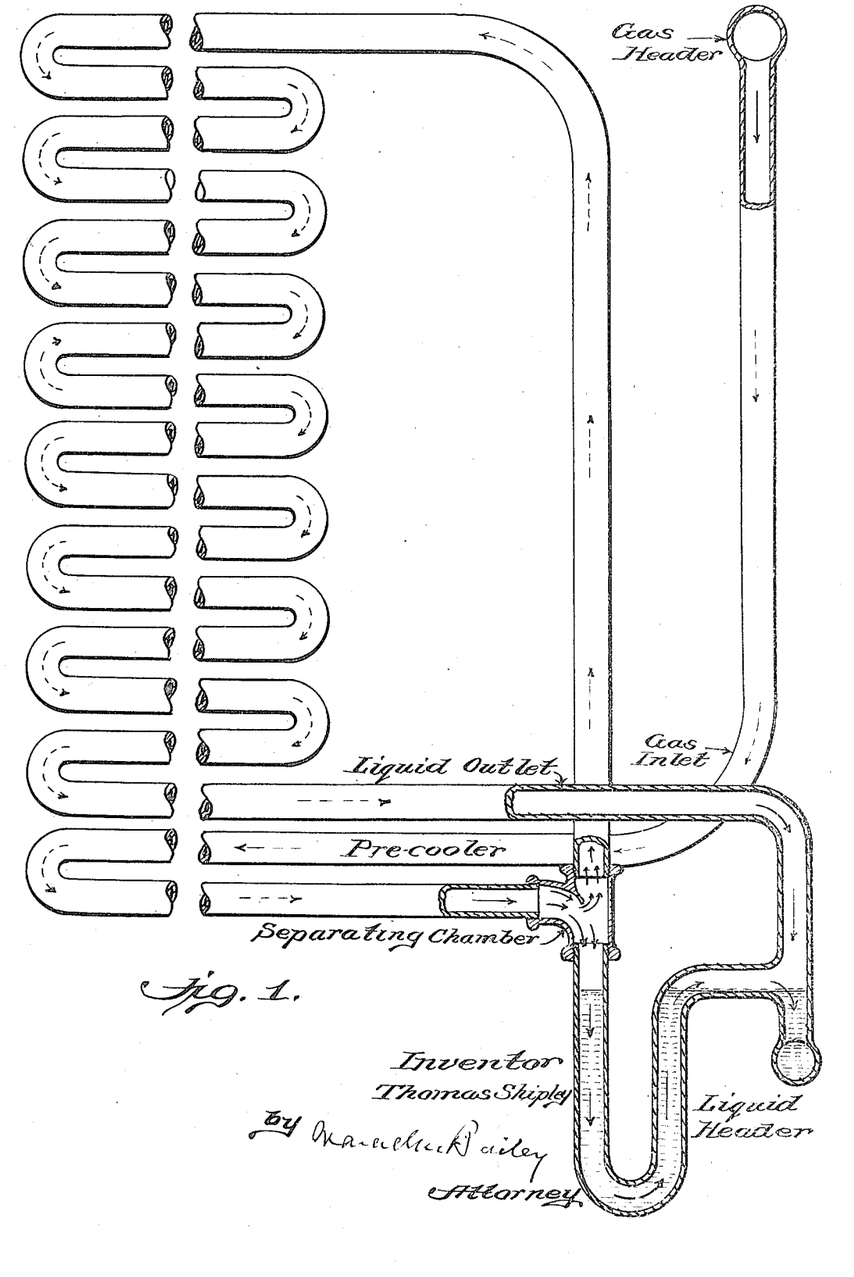
Figure 1 is a diagrammatic sectional elevation of a condenser of non-flooded type, equipped with a pre-cooler, and embodying my invention.

In Fig. 1 is illustrated a condensing coil of usual type, and a gas header connected to the inlet end of the top stretch of the pre-cooler, the lower stretch of which communicates through a riser with the top stretch of the condensing coil; from the bottom stretch of the condensing coil leads the liquid outlet pipe to the liquid header. Thus far there is nothing new. Interposed, however, between the bottom stretch of the pre-cooler and the riser are to be found the means for separating out the entrained liquid from the gas, which embody my invention, consisting of a separating chamber connected at the top to the riser, at the side to the bottom stretch of the pre-cooler, and at the bottom to a drain in the form of a U-trap connected at one end to the bottom of the separating chamber and at the other end to any suitable receiver—in this case to liquid header as shown. In the separating chamber is a deflecting plate or baffle which directs the entrained liquid downward into the U-trap drain, while permitting the passage around it into the riser above of the gas thus freed from the liquid. The liquid thus separated out from the gas drops downward into the trap where it gathers, forming a stopper against back pressure from the gas, the surplus liquid as it overflows the trap passing therefrom into the liquid header. If a number of thus-equipped sections be assembled as a condenser, all of them connected to a common gas header on the one hand and to a common liquid header on the other hand, it will be seen that the gas will be furnished freed from the entrained liquid, in the same condition, and under the same pressure to all of them.

Figure 2:
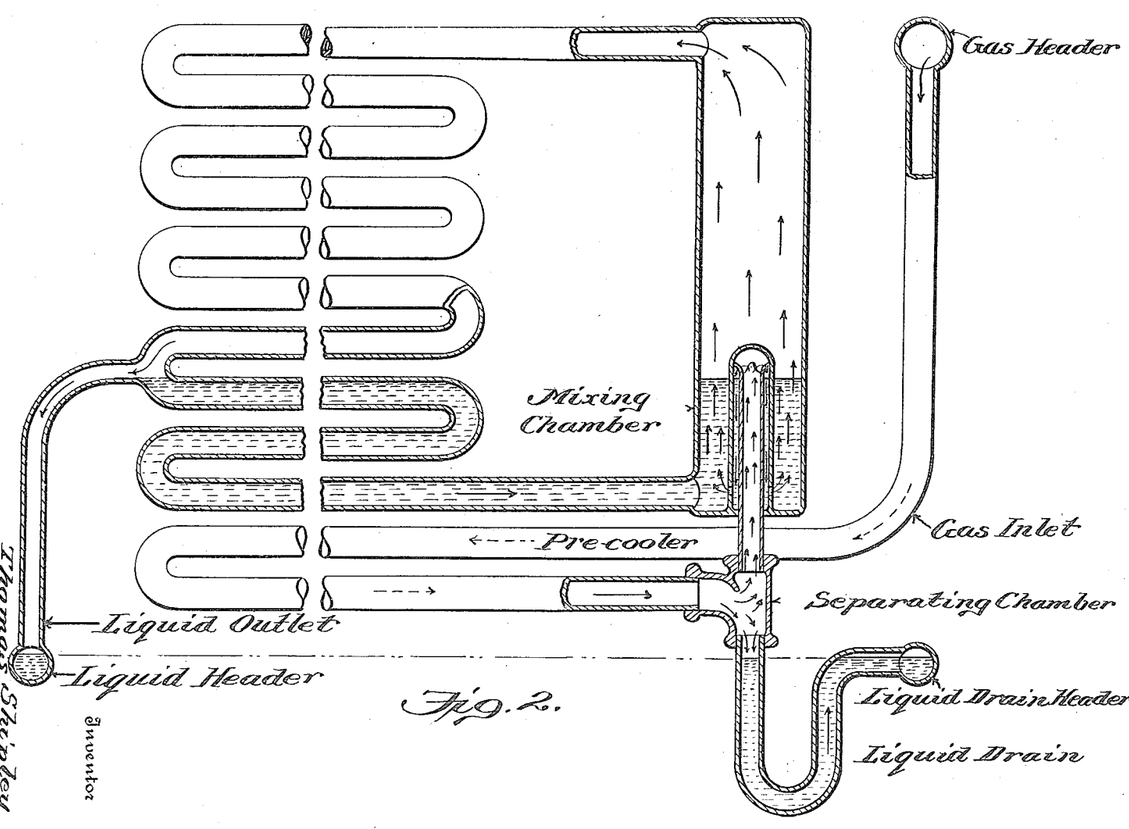
Fig. 2 is a similar diagrammatic representation of a condenser of the flooded type.

In Fig. 2 there is the same general arrangement as in Fig. 1, save that the liquid outlet is at a higher level on the condensing coil so as to maintain the requisite body of liquid into and through which the gas is to be forced; and that there is substituted for the riser a mixing chamber connected near its lower end to the liquid containing portion of the condensing coil so as to receive and maintain the body of liquid into and through which the gas is to be forced, said chamber containing a nozzle connected to and receiving its supply of gas from the separating chamber as shown. The nozzle, as will be hereinafter fully shown and described, consists of a stand pipe connected to the separating chamber and a surrounding jacket closing the stand pipe on top and sides and leaving a narrow space between the two down through which the gas which passes over the top of the stand pipe is forced into and through the body of liquid in the mixing chamber through holes in the lower part of the jacket, the resulting mixture of liquid and gas passing up through and out from the mixing chamber into the condensing coil. The liquid outlet is located at such height on the condensing coil that the level of the liquid will be slightly below the top of the stand pipe part of the gas nozzle, thus maintaining a constant head of liquid in the mixing chamber. The stand pipe and the jacket through which the ammonia gas is conducted under pressure from the gas header to the discharge orifices in the jacket form in effect an inverted U-trap, the return bend of which stands at a higher level than the liquid in the mixing chamber, thus preventing any overflow of liquid from the mixing chamber through the standpipe.

If a number of thus-equipped flooded condenser units be assembled, all of them connected to a common liquid header and to a common gas header, it will be seen that the gas freed from entrained liquid will be forced under one and the same pressure through bodies of liquid all of the same head, the resulting mixture of gas and liquid being the same for every section of the condenser and being forced into each section under the same pressure.

Figure 3:
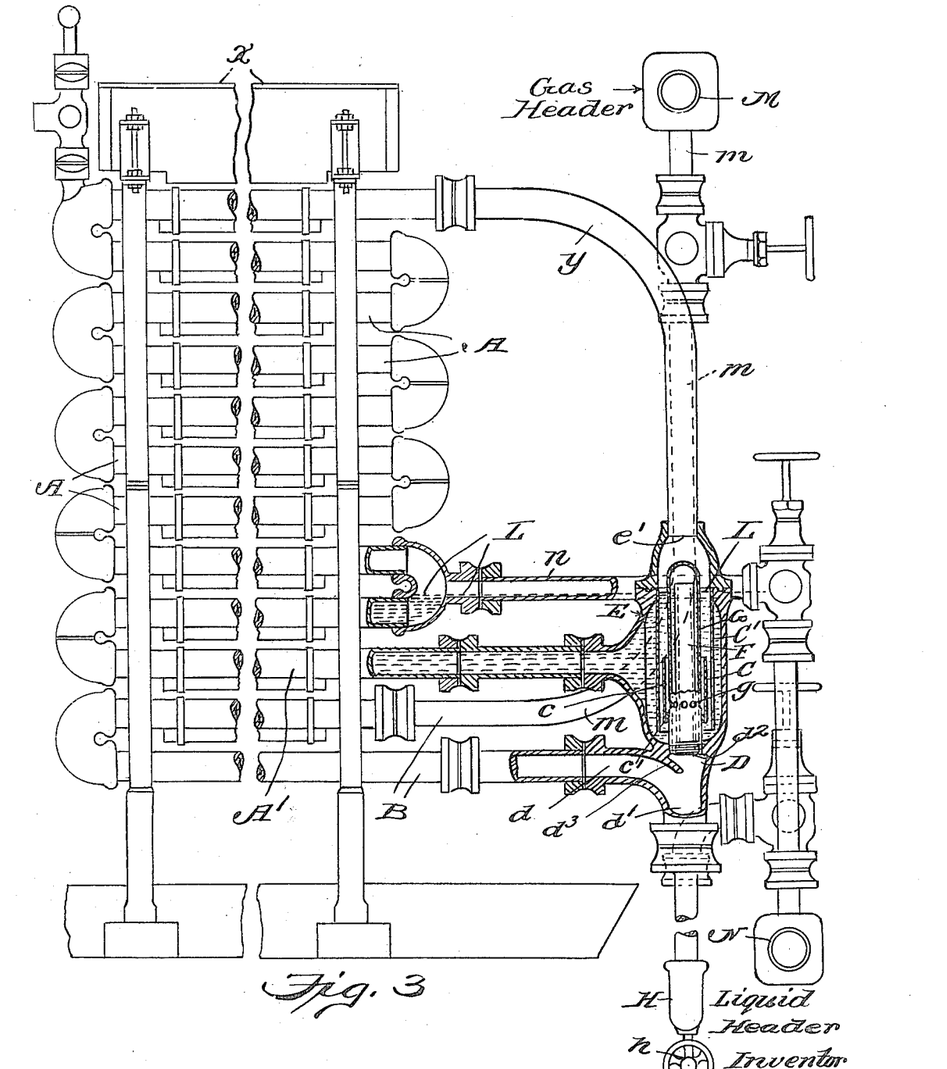
Fig. 3 is a side elevation, partly in section, of a coil condenser section of the flooded type embodying my invention in its preferred form, the same being broken away between its ends in order to economize space.
Figure 4:
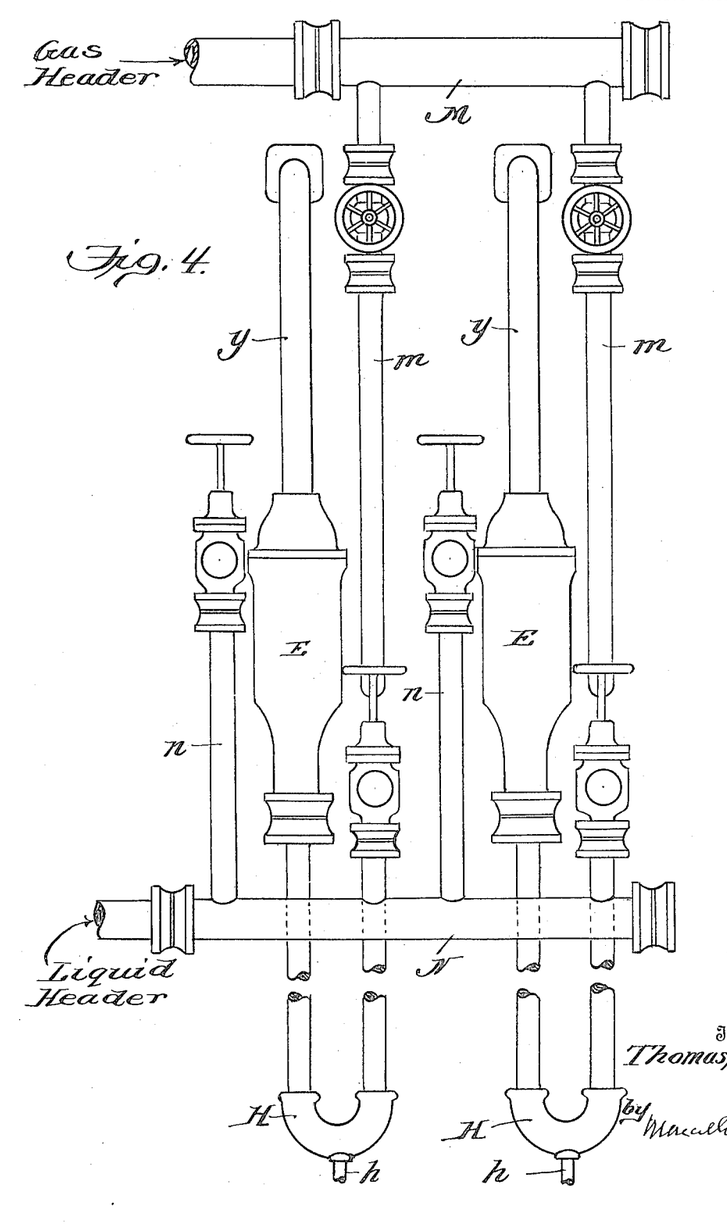
Fig. 4 is a front elevation of the fittings and connections to the gas header, liquid header and condenser sections respectively, required for a battery composed of two condenser sections—the sections themselves not being shown in order to avoid obscuring the other parts.
Figures 5, 6:
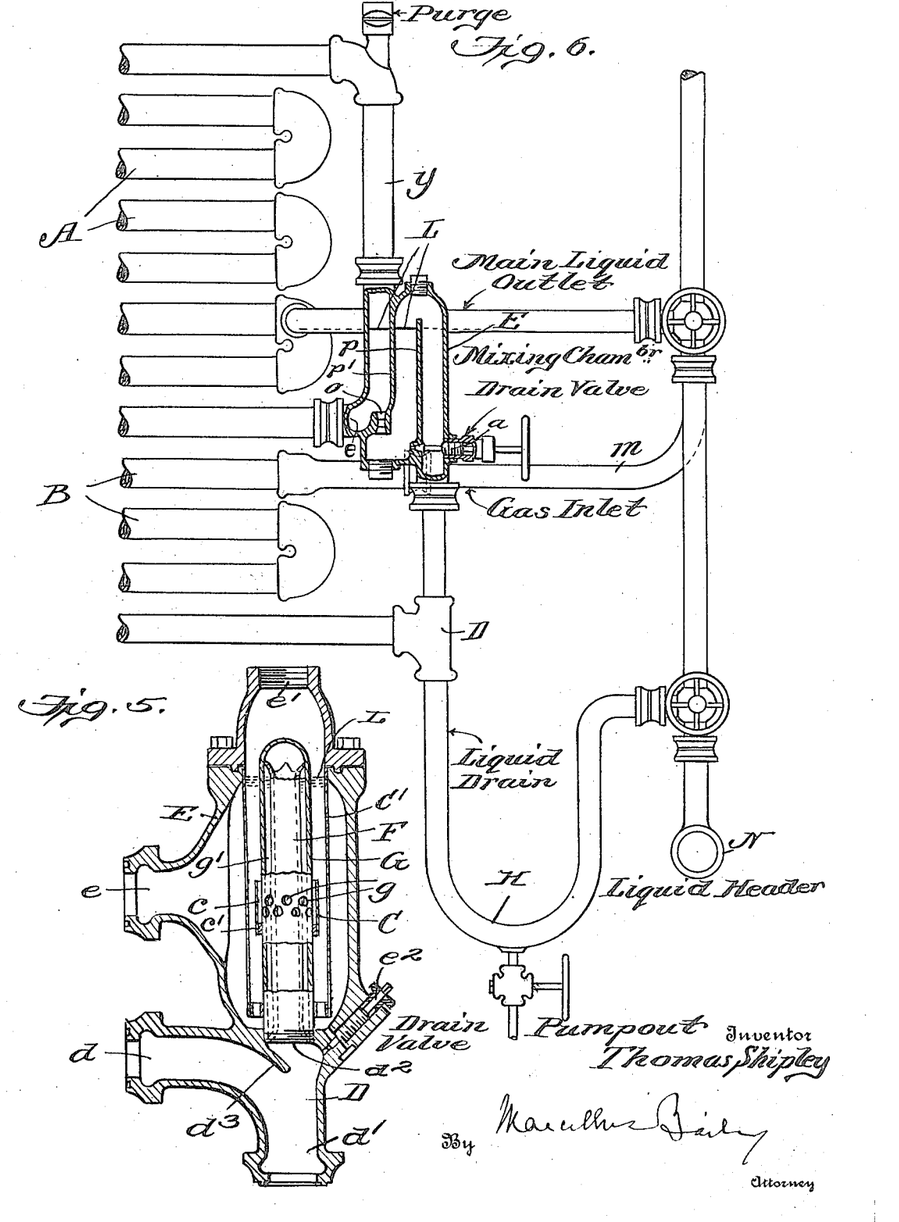
Fig. 5 is an enlarged vertical central section detached of the combined liquid-separating, liquid-head-maintaining and gas-injecting device shown on smaller scale in Fig. 3, with a slight change in the location of the discharge openings in the nozzle and the deflector surrounding the same, the plane of section in the two figures being the same.
Fig. 6 is a like view of a modified form of such device.

Referring now to Figs. 3, 4, 5, A is a condensing coil which may be supposed to be a section of a coil condenser, composed of a number of such units. The cooling water used enters the overhead distributing trough $x$ and is showered down upon the coil below as customary in this style of condenser. The bottom stretch A' of the condensing coil is connected to the top stretch of said coil through the intermediary of the mixing chamber E into which the bottom stretch A' opens, and the riser $y$ which leads upward from the top of said mixing chamber to the top stretch of the coil.

B is the pre-cooler composed of two stretches, the top one connected by pipe $m$ to the gas header M, and the bottom one opening into the entrained-liquid separating chamber D, which in the present instance is in a unitary casting with the mixing chamber E.

N is the liquid header into which leads the liquid outlet pipe $n$ from the condensing coil A.

As shown on enlarged scale in Fig. 5, the separating chamber D, has a lateral inlet $d$ connected, as seen in Fig. 3, to the bottom stretch of the pre-cooler B, and through which inlet the gas, along with the entrained liquid, is discharged from the pre-cooler into the separating chamber. At the bottom of the separating chamber is an outlet $d'$ for the entrained liquid which is separated out from the gas; and at the top of said chamber is an outlet $d^2$ for the gas thus freed from the entrained liquid, said outlet being filled by a combined liquid trap and ejecting nozzle (to be presently described) into which the gas passes from the separating chamber. Between the gas and entrained liquid inlet $d$ and the gas outlet $d^2$ is a downwardly inclined baffle or deflector $d^3$ which directs the entering mixture downward, the entrained liquid dropping down to the outlet $d'$ and the gas, thus freed from the liquid, passing around the lower edge of the baffle and thence upward to the gas outlet $d^2$.

Above the separating chamber D is what I have termed, for distinction's sake, the mixing chamber E, which contains the body of condensed liquid ammonia into which the gas is injected. This mixing chamber is provided with a lateral inlet $e$ connected at a suitable point to some portion of the condenser which is below the level of the liquid outlet $n$ and which, therefore, is filled with liquid. Through this inlet $e$, which in this instance is connected to the bottom stretch A' of the condensing coil, liquid from the coil freely enters, and fills the mixing chamber to a height coincident with the level of the liquid outlet $n$ and maintains the body of liquid in said chamber at that level, indicated by the dotted line L—L, Figs. 3 and 5. In the floor of the mixing chamber is set the ejector nozzle and in the dome-shaped top of said chamber is an outlet $e'$ (Fig. 5) from which the riser $y$ leads to the top stretch of the condensing coil A. A drain valve $e^2$ is provided controlling an outlet from the bottom of the mixing chamber into the separating chamber below, as shown in Fig. 5, designed to be used in pumping out to relieve the condenser of liquid which may be trapped therein. A similar drain valve provision can be made for the mixing chambers shown in the other figures of the drawings.

The combined liquid trap and ejector nozzle, the construction of which may vary considerably without departure from my invention, consists in the present instance of a stand pipe F which receives the gas from the separating chamber D below, and a concentric jacket G which is closed at the top so as to inclose not only the sides but the open top of the stand pipe, and is of somewhat greater diameter than the latter, leaving between them an annular space $g'$ as shown. Apertures $g$ for the discharge of the gas are formed in said jacket below the level of the liquid in the mixing chamber, and preferably at or near its lower end. The gas from separating chamber D passes up through the stand pipe F, over the top of the same into and down through the annular space $g'$ between the walls of the stand pipe and its inclosing jacket, whereby the gas is conducted downward below the level of the body of liquid in the mixing chamber until it reaches the orifices or discharge apertures $g$ through which it is forced under pressure into and through the body of liquid in the mixing chamber, the resulting mixture passing off through the riser $y$ in the top of the mixing chamber to the top stretch of the condensing coil A.

The supply of liquid from the condenser enters the mixing chamber at $e$. In order to insure a constant supply of the liquid to this chamber it is necessary to have the bottom of the main liquid outlet pipe $n$ of the condenser above the level of the bottom of the lower one of the two stretches of the coil connected by the bend to which said outlet is applied as indicated in Fig. 3, where the parts in question are shown in partial section. The thus-maintained level of the liquid in the mixing chamber is indicated by the dotted line L—L in Fig. 3.

In order to prevent the liquid supply to the mixing chamber from flowing over into the stand pipe F through the annular space between it and the jacket G when the condenser is not in operation, the top of the stand pipe as shown in Figs. 3 and 5, should extend some distance above the level L—L of the body of liquid maintained in the mixing chamber. Under this arrangement it will be seen that the standpipe and its inclosing jacket form in effect an inverted U liquid trap whose up-leg is the interior of the stand pipe, whose down-leg is the annular space $g'$ between the jacket and standpipe, and whose return bend is at the top of the standpipe between these two legs. Inasmuch as this return bend is above the level of the liquid in the mixing chamber the overflow of liquid from the mixing chamber is prevented when the condenser is not in operation—the liquid at this time filling the annular space $g'$ as well as the body of the condenser up to the level L—L. When the condenser is in operation the pressure of the entering gas is sufficient to blow the liquid out from the annular space $g'$ through the nozzle opening or openings back into the body of liquid in the mixing chamber external thereto.

The entrained liquid separated out from the entering gas in separating chamber D is carried off by a drain pipe in the form of a U-trap H connected at one end to the outlet $d'$ at the bottom of the separating chamber D, and at the other end to the liquid header N. At the bottom of the U-trap there is preferably placed a valve or cock controlled drain or pump-out pipe $h$ to be used for drawing off the liquid therefrom whenever desired. The entrained liquid which during the operation of the condenser is separated out from the gas gathers in the trap and keeps it full, the surplus liquid which overflows the trap being conducted into the liquid header N.

And in order, when the condenser resumes operation, to force out of the annular space $g'$ surrounding the stand pipe F—between it and the jacket G—the liquid which enters that space through the apertures $g$ and accumulates therein while the condenser is not in operation, the leg of the U-pipe trap H must be longer than the distance from the top of the stand pipe to the apertures $g$ near the bottom of the jacket G, otherwise the pressure of the entering gas in the separating chamber will empty the U-trap H rather than the annular passage $g'$ between the two parts of the nozzle.

In order to properly direct the entering gas and to insure its upward passage through the body of liquid in the mixing chamber and from thence out through outlet $e'$ in the top of said riser, the jacket G, is provided with a deflector C, in the shape of a tube which surrounds the jacket and is of slightly greater diameter than the latter so as to leave between the two a narrow annular passage $c$ for the gas discharged from the orifices $g$. The lower end of the deflector is secured in place by suitable means, in this instance by a ring $c'$ interposed between the jacket and the deflector at a point below the openings $g$, and united with the two by a solder joint which will tightly close the lower end of the deflector $c$ against the passage of gas in that direction. The deflector at its upper end extends somewhat above the plane of the horizontal axis of the liquid inlet $e$ in the mixing chamber and its length will depend upon the distance between this point and the point where the holes $g$ in the jacket are located. In Fig. 3 these holes are located near the lower end of the jacket and the deflector is long enough to extend from just below the thus-located holes to a point above the horizontal center of the inlet $e$. In Fig. 5, the holes $g$ are located at a point considerably higher up on the jacket, and the deflector is correspondingly shortened. The annular space $c$ between the deflector and jacket is in effect a somewhat constricted annular nozzle through which the gas under pressure is forcibly directed upward as an annular jet into the body of liquid in the mixing chamber, and toward the outlet $e'$ in the dome of the mixing chamber instead of seeking, as it might otherwise do, an outlet through the nearer openings in the mixing chamber communicating with the liquid containing portion of the condenser coil. In order to still further insure the proper upward passage of the gas through the mixing chamber, I interpose between the deflector and the inlet $e$, a cylindrical baffle C' which is secured by a tight joint to the dome shaped top of the mixing chamber, and extends down as a curtain between the deflector and the walls of the mixing chamber, its open lower end terminating above the bottom of the mixing chamber to allow the free upward circulation set up by the upwardly directed discharge of the gas, through the annular passage between the baffle C' and the jacket G.

The mode of operation of the thus-equipped condenser will be understood from what has already been stated, and further description is unnecessary.

In the modification shown in Fig. 6, the separating chamber D and mixing chamber E are separate from one another, and the structural details of the mixing chamber are different from what is shown in the preceding figures. In this figure the mixing chamber internally is divided by two vertical partitions $p$, $p'$, into a sinuous passage of three vertical stretches, the one the continuation of the next. The first vertical partition $p$ extends from the bottom of the mixing chamber to near the top thereof; the second vertical partition $p'$, at an interval from $p$, extends from the top of the mixing chamber to near the bottom thereof; and at the bottom of the partition $p'$ and bridging the opening between it and the adjoining wall of the mixing chamber is a diaphragm in which is located a nozzle $o$ shaped somewhat like the combining nozzle of an ejector and for a similar purpose. From the top of the vertical stretch in which this nozzle $o$ is located, extends the riser $y$ which leads to the top stretch of the condenser coil, as in Fig. 3. The liquid from the condenser enters the mixing chamber through the inlet $e$, and rises therein within the space between the inlet and the partition $p$ to a level L—L a little below the top of the partition $p$, just as the said level is below the top of the stand pipe F in Fig. 3, and for a similar purpose—the stretch included being the partition $p$ and the adjoining wall of the mixing chamber corresponding to the stand pipe F in Fig. 3. The gas freed from liquid passes up from the separating chamber D through a pipe in the top of said chamber into this stretch of the mixing chamber, passes up therein over the top of partition $p$, thence downward through the next stretch between the partitions $p$, $p'$, under the lower end of the partition $p'$, and thence up through the combining nozzle $o$ and the third stretch, from whence the resulting mixture passes through the riser $y$ to the top stretch of the condenser coil. The bottom of the separating chamber D is connected to the liquid header by a U-trap as in Fig. 3. Like lettered parts in the two figures represent the same parts with the same connections and functions. The drain valve $a$ with which the mixing chamber in Fig. 6 is provided, has the same function and is designed to be used for the same purpose as the drain valve $e^2$ in Fig. 5.

In this modification the first stretch between the partition $p$ and the adjoining wall, receives the gas from the separating chamber D below, and corresponds in all its functions to the standpipe F in Fig. 5; the second or down stretch between the two partitions $p$, $p'$, corresponds to the annular space $g'$ between the stand pipe F and jacket G, the nozzle $o$ corresponds to the orifices $g$ in the jacket, and the deflector surrounding the same; and the third stretch between the partitions $p'$ and the adjoining wall, which, like the first stretch, is an upward stretch, and through the floor of which the nozzle $o$ extends, corresponds to that portion of the mixing chamber of the device in Fig. 3 which contains the liquid into which the gas is injected from the nozzle when the condenser is in operation. When the condenser is not in action the second and third stretches will be filled with liquid up to the level indicated at L; the second stretch, when the condenser is in operation is emptied of its liquid which, by pressure of the incoming gas, is driven therefrom through the nozzle $o$ into the chamber or stretch above.

It will be understood that the term mixing chamber, as used in connection with the flooded condenser, intends that portion of the condenser circuit, typical of any condenser of this kind, which contains the body of liquid into which the entering gas is injected.

Figure 7:
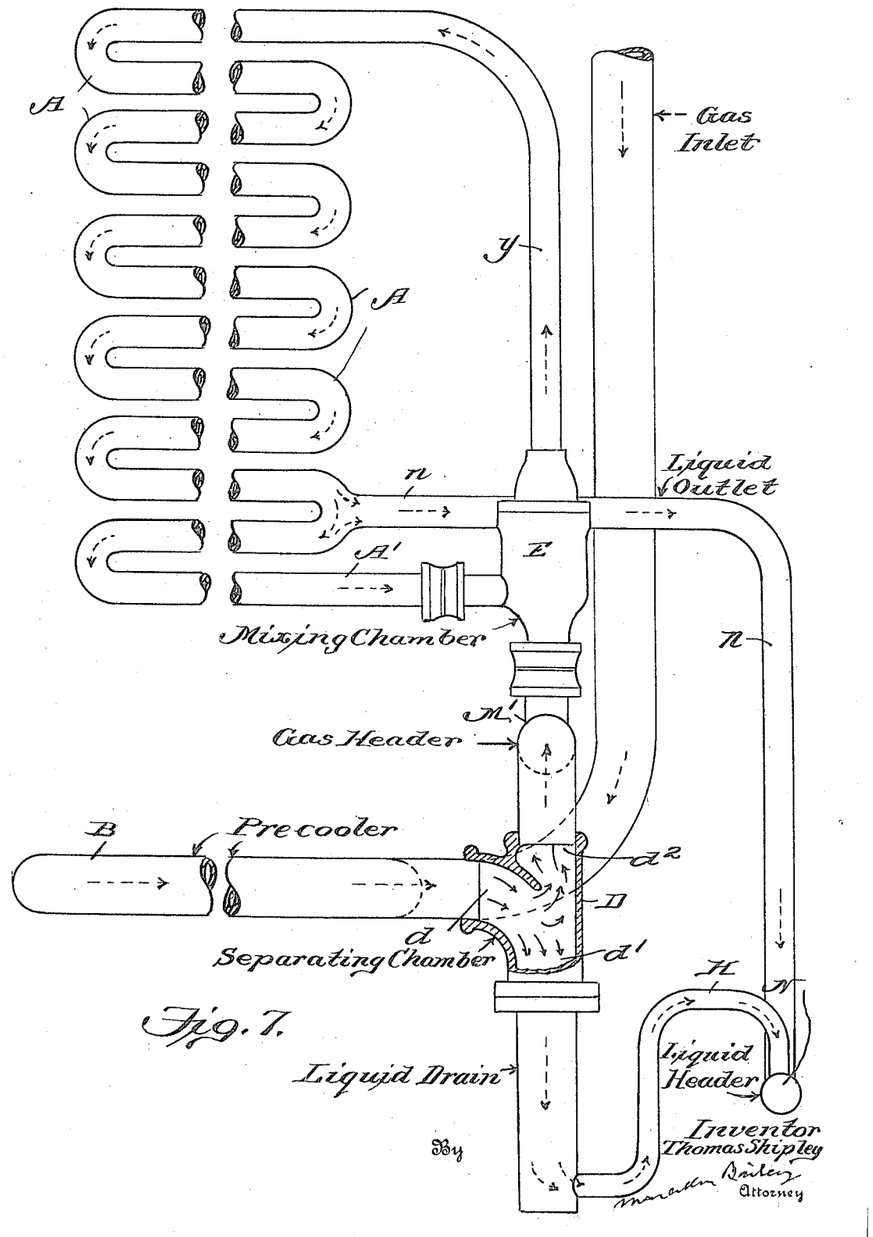
Fig. 7 is a sectional side elevation of a coil condenser of the flooded type composed of a plurality of condenser sections with a pre-cooler common to all the sections, illustrating the preferred application of my invention to a condenser of that type.
Figure 8:
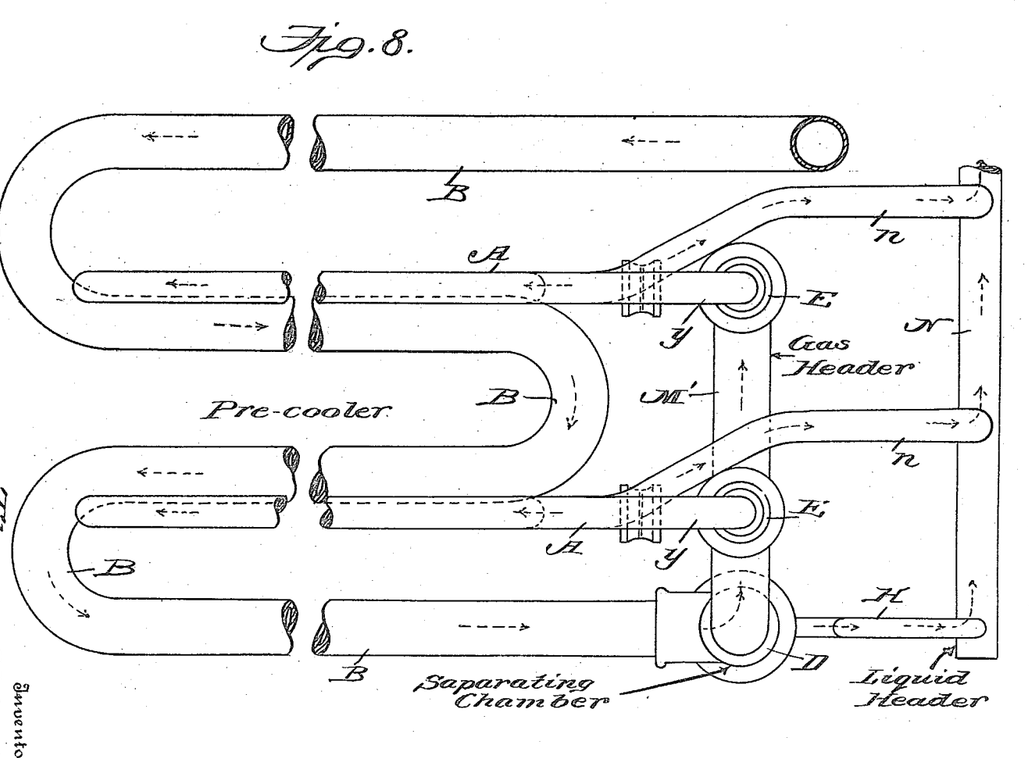
Fig. 8 is a plan of the same.
Figure 9:
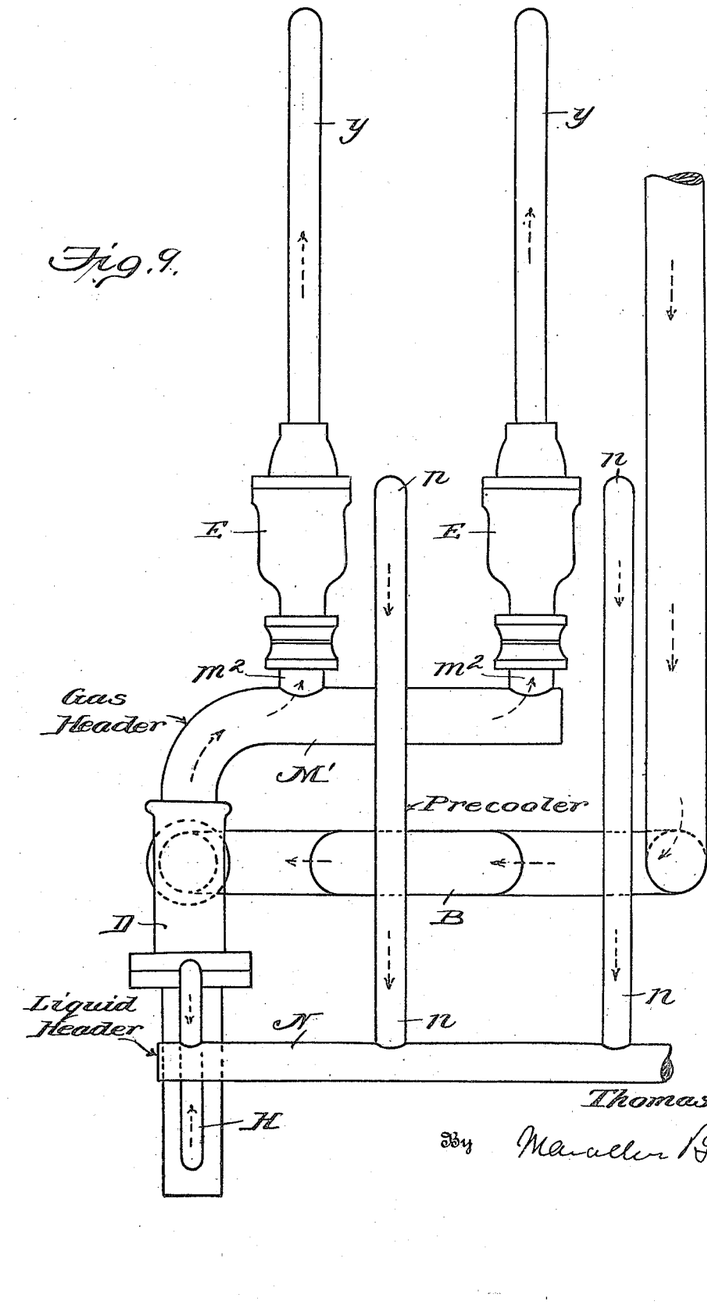
Fig. 9 is a front elevation of the fittings and connections required for a battery of this type composed of two condenser sections.

In the modification illustrated in Figs. 7, 8, 9, the condenser is of the flooded type, composed of two condenser sections A, and a pre-cooler B common to both condenser sections. Each condenser section has a liquid outlet $n$ communicating with a liquid header N, and a riser $y$ leading from the top of a mixing chamber E to the top stretch of its coil A, the mixing chamber being connected to the bottom stretch A' of the coil—these connections being substantially those already described in connection with Fig. 3. Each mixing chamber E, however, is not associated in the same casting with a separating chamber D, as in Figs. 3 and 5. On the contrary, while there is one mixing chamber for each condenser section, there is but one separating chamber D for all of them, having outlets $d'$, $d^2$ and inlet $d$, and connections the same as in Figs. 3 and 5, save that the gas outlet $d^2$ opens into a gas header M' from which header lead separate gas service pipes $m^2$, one for each section A, and there being interposed between each gas service pipe and the riser $y$ leading to the top stretch of its condenser section, a mixing chamber E having the same mode of operation as already described in connection with the preceding figures. In the present modification, as well as in the arrangements previously described where pre-coolers are employed, the separating chamber is interposed between the pre-cooler and the inlet end of the condenser, and to this extent they are the same. But whereas in the preceding figures there is a separating chamber and a mixing chamber for each condenser section, in the modification now under consideration there is but one pre-cooler for all the condenser sections, and a single separating chamber, which is located between the pre-cooler and a gas header from which lead individual gas supply connections for the several sections. The gas is freed from entrained liquid before it enters the header, and it is supplied therefrom in the same condition to all the condenser sections.

Figure 10:
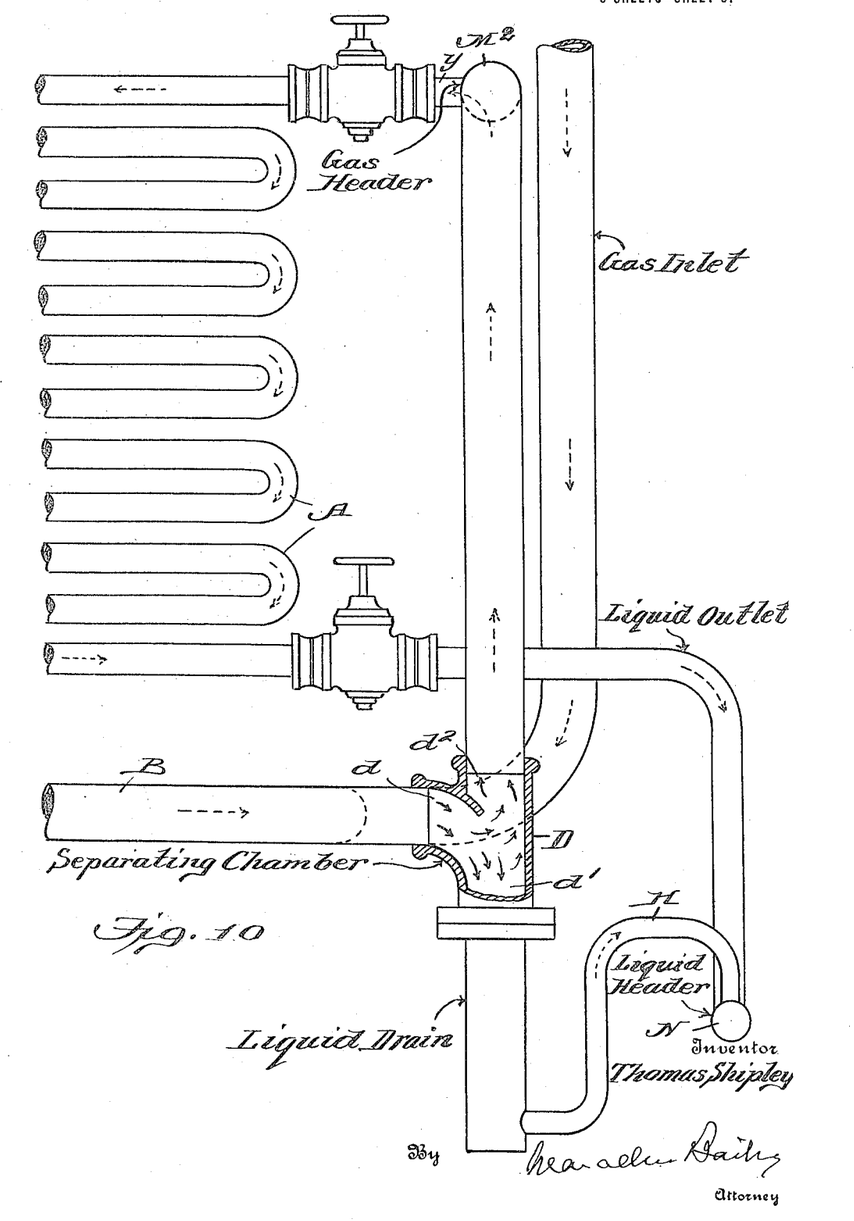
Fig. 10 is an elevation illustrative of the application of my invention to a non-flooded condenser in which there is only one pre-cooler common to a plurality of condenser sections.

The same scheme is applicable to a non-flooded condenser, composed of a number of condenser sections and a pre-cooler common to all the sections, as illustrated in Fig. 10. In this modification, the flooded arrangements being dispensed with, the gas freed from entrained liquid by its passage through the separating chamber D is conducted to the gas header $M^2$, whence it is distributed through service pipes to the top stretches of the several sections of the condenser—as will be understood without further explanation.

I do not here claim broadly the combination, in a flooded condenser, with the condenser body, the mixing chamber, and connections between the liquid containing portion of said condenser body and the mixing chamber for maintaining in the latter a body of liquid at a predetermined level, of a gas injecting nozzle in said mixing chamber having its discharge orifice below the level of the liquid therein, and a conduit through which gas under pressure is supplied to said nozzle formed as a reversed U-trap the top of the return bend of which stands above the level of the liquid in the mixing chamber, the same having been made by me the subject of a separate application for Letters Patent filed of even date herewith bearing Serial No. 171,925. My claim here so far as concerns the subject matter just referred to is limited to that particular embodiment of the same illustrated in Figs. 3 and 5 of the drawings accompanying this specification.

Having described my improvements and the manner in which the same are or may be carried into practical effect, I state my claim as follows:

1. In a condenser for ice making and refrigerating purposes, the combination with the body of the condenser, the inlet or nozzle through which the gas to be condensed is injected into the condenser body, and a source of supply from which the thus-injected gas is drawn, of means interposed between said inlet or nozzle and the source from which the gas is supplied thereto, whereby the entrained liquid contained in the thus-supplied gas is separated out and carried off from said gas before the latter enters said inlet or nozzle, substantially as and for the purposes hereinbefore set forth.

2. In a condenser for ice making and refrigerating purposes, the combination with the body of the condenser and inlet or nozzle through which the gas to be condensed is introduced therein, and a source of supply from which the thus-introduced gas is drawn, of a pre-cooler between the condenser inlet and the source of gas supply through which the gas must pass before reaching the condenser, and means interposed between the condenser inlet and the pre-cooler whereby the entrained liquid is separated out and carried off from said gas, after the latter leaves the pre-cooler and before it enters the condenser, substantially as and for the purposes hereinbefore set forth.

3. In a condenser for ice making and refrigerating purposes, the combination with the body of the condenser and the gas inlet or nozzle through which the gas to be condensed is supplied to the condenser; of a separating chamber having an inlet adapted to be connected to a gas header or source of gas supply, an outlet at the bottom for the escape of the entrained liquid separated out from the gas during its passage through the separating chamber and an outlet at the top communicating with the gas inlet or nozzle in the condenser body, through which outlet the gas thus freed from the entrained liquid is supplied to said inlet or nozzle; and a trapped drain pipe connected to the liquid outlet of said separating chamber, substantially as and for the purposes hereinbefore set forth.

4. In a condenser for ice making and refrigerating purposes, a condenser composed of a plurality of condenser sections, each provided with a gas inlet or nozzle and a main liquid outlet; a gas header common to all the sections, to which the gas inlet or nozzle of each section is individually connected; a liquid header common to all the sections, to which the main liquid outlet of each section is individually connected; and separating chambers, one for each section, interposed between the inlets or nozzles of the several sections and the gas header, through which chambers the gas supplied from the gas header to the several sections must pass before entering said sections, each separating chamber being provided with an inlet port individually connected to the gas header, a bottom outlet port for the escape of the entrained liquid in the gas admitted to the separating chamber, and a top outlet port through which the gas thus freed from the entrained liquid passes to the inlet or nozzle of the condenser section to which said separating chamber pertains; trapped drain pipes, one for each separating chamber, connected to the liquid outlet port of their respective separating chambers; and a liquid receiver or header common to all of the said trapped drain pipes, substantially as and for the purposes hereinbefore set forth.

5. In a condenser of the flooded type, the combination with the condenser body provided with the usual gas inlet and main liquid outlet, of a mixing chamber connected to and receiving its supply of liquid from the liquid containing portion of the condenser body; means for maintaining the thus-supplied liquid at a predetermined level in the mixing chamber; a source of gas supply; a nozzle through which the thus-supplied gas is injected into the body of liquid in the mixing chamber; an outlet port in the mixing chamber connected to and communicating with the inlet end of the condenser body; and means interposed between the mixing chamber and the source of gas supply whereby the entrained liquid in the thus-supplied gas is separated out and carried off from said gas before the latter reaches the mixing chamber inlet nozzle, substantially as and for the purposes hereinbefore set forth.

6. In a flooded condenser, the combination with the condenser body, a mixing chamber and connections between the liquid containing portion of the condenser body and the mixing chamber for maintaining in the latter a body of liquid at a predetermined level; of a stand pipe adapted to be connected to a source of gas supply under pressure and extending up into the mixing chamber above the level of the liquid therein; a surrounding concentric jacket closed at its upper end so as to inclose not only the sides but also the upper end of the stand pipe and of greater diameter than the latter so as to leave between them an annular space for the downward passage of the gas which enters the stand pipe and passes up through, and over the open upper end of, the same; discharge orifices in said jacket below the level of the liquid in the mixing chamber; and a deflector concentrically surrounding the jacket, open at its upper end and secured at its lower end by a closed joint to the jacket at a point below the gas discharge orifices in the same, the open upper end of the deflector being below the level of the liquid in the mixing chamber, and the deflector being of sufficiently greater diameter than the jacket to provide between them a narrow annular passage through which the gas under pressure issuing from the orifices in the jacket is directed upwardly and discharged as an annular jet into the body of liquid above.

7. The combination with the elements of the combination specified in claim 6, of the baffle interposed between the deflector and the surrounding walls of the mixing chamber, substantially as and for the purposes hereinbefore set forth.

In testimony whereof I hereto affix my signature.

THOMAS SHIPLEY.

Copies of this patent may be obtained for five cents each, by addressing the "Commissioner of Patents, Washington, D. C."